April 9, 1968  T. R. BAKER ET AL  3,376,969
CONVEYING DEVICE FOR GROUPING ARTICLES
Filed May 12, 1966  5 Sheets-Sheet 1

INVENTOR.
Thomas R. Baker
William H. Hittenberger
BY Howard G. Russell
their ATTORNEY INVENTORS
Thomas R. Baker
William H. Hittenberger INVENTORS
Thomas R. Baker
BY William H. Hittenberger Howard G. Russell
their ATTORNEY

United States Patent Office 3,376,969
Patented Apr. 9, 1968

3,376,969
CONVEYING DEVICE FOR GROUPING ARTICLES
Thomas R. Baker, Los Altos, and William H. Hittenberger, Santa Clara, Calif., assignors to Kliklok Corporation, New York, N.Y., a corporation of Delaware
Filed May 12, 1966, Ser. No. 549,571
8 Claims. (Cl. 198—34)

ABSTRACT OF THE DISCLOSURE

The present improvements provide a conveying device capable of handling tacky articles, such as fresh sausages, which may arrive irregularly spaced and in irregular sequence. Their arrival on a main conveyor is detected by a sensor which then causes the main conveyor to advance by about the length, or diameter, of one article. An overhead conveyor synchronized with the main conveyor and moving at the same speed as the latter comprises a normally raised leading portion which overhangs the sensor station and, upon arrival of an article at the sensor, is lowered to grip the article between the overhead and the main conveyor. The main conveyor discharges onto a slower moving outfeed conveyor on which the articles are tightly packed against one another. Tight packing is aided by a trailing portion of the overhead conveyor which overhangs the slower outfeed conveyor and causes articles to roll tightly against one another, even though tacky. A second overhead conveyor is provided above the outfeed conveyor and is synchronized with the latter to move at the same speed as the outfeed conveyor.

This invention relates to improvements in conveying devices for grouping articles for any purpose, for example for the purpose of packaging of the articles.

Taking the latter application as an example, it is often necessary to rearrange spaced articles either in a differently spaced arrangement, or to arrange them tightly packed together, so as to eliminate spaces between them. It may even be necessary to carry the tight packing to a degree in which deformable articles are slightly deformed.

There are many articles which are difficult to handle in that their surfaces may be slippery as one extreme, or tacky as another extreme condition. An example of such articles are sausages which emerge from the sausage forming or stuffing machine in a slippery condition and after brief exposure to the air become highly tacky and resist displacement by pushing because of their tendency to adhere to any surface on which they are placed and their tendency to adhere to one another.

The present invention provides a conveying device which is capable of accepting articles, such as sausages, supplied to the device in spaced relationship and which then regroups them to an arrangement of lesser spacing, or even moves them tightly together in order that they may be loaded into receptacles. This may even be accomplished by a vacuum device which lifts a group of six, eight, or ten tightly packed sausages and places them into a carton, or a tray, or into a stacking device for further handling or packaging.

The objects, features and advantages of this invention will appear more fully from the detailed description which follows accompanied by drawings showing, for the purpose of illustration, a preferred embodiment of the invention specifically designed to handle sausages. The invention also resides in certain new and original features of construction and combination of elements hereinafter set forth and claimed.

Although the characteristic features of this invention which are believed to be novel will be particularly pointed out in the claims appended hereto, the invention itself and the manner in which it may be carried out may be better understood by referring to the following description taken in connection with the accompanying drawings forming a part of it in which:

Figure 1:
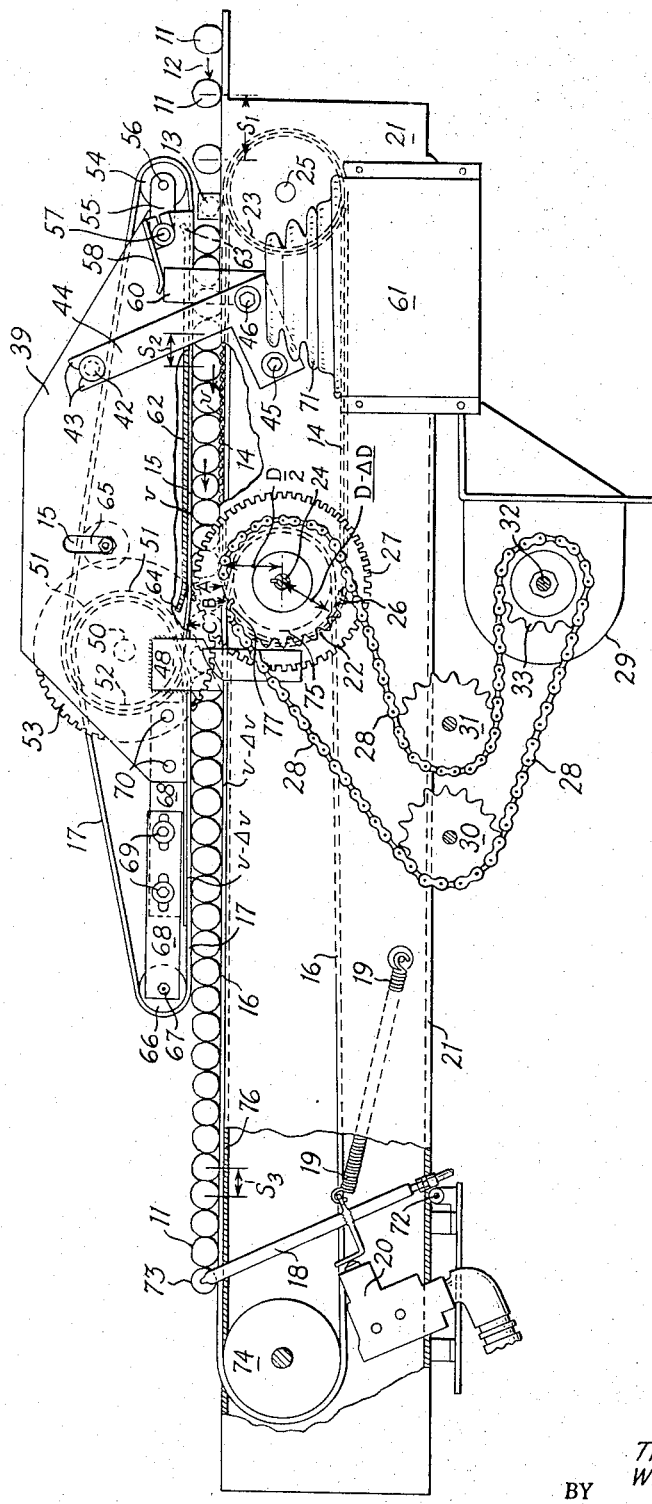
FIG. 1 is an elevational view, partially diagrammatic, of a conveying device for grouping cylindrical objects such as sausages.

In the following description and in the claims various details will be identified by specific names for convenience. The names, however, are intended to be generic in their application. Corresponding reference characters refer to corresponding parts in the several figures of the drawings.

The drawings accompanying and forming part of this specification disclose certain specific details of construction for the purpose of explanation of broader aspects of the invention, but it should be understood that structural details may be modified in various respects without departure from the principles of the invention and that the invention may be incorporated in other structural forms than shown.

An understanding of the mechanism shown in the drawings will be facilitated by a brief description, at the beginning, of its function.

Referring to FIG. 1, articles in the illustrated case sausages 11, arrive from the right, supplied by any convenient form of conveying mechanism (not shown in FIG. 1). The sausages are supplied parallel to one another, their ends are preferably aligned, and their spacing $S_1$ is shown to be relatively wide and uniform. The spacing need not be uniform as the mechanism embodying the invention accepts unequally spaced articles and compensates for any irregularities in the spacing $S_1$.

The supplying conveying mechanism moves the articles in the direction of the arrow 12 into the path of a detector which in the present case has the form of a photocell 13 responsive to a beam of light projected across the path of the articles.

The detector or photocell is located at a point where the articles 11 come into engagement with an intermittently operable conveyor which happens to be a chain conveyor 14. This conveyor moves at a mean linear velocity $v$. The conveyor 14 is started in response to a signal given by photocell 13 and is so controlled as to come to a stop after advancing a distance $S_2$ somewhat greater than the diameter of the sausage 11, but less than double the diameter.

In order to prevent the sausages from rolling as a result of the sudden starting and stopping of the conveyor 14, an overhead conveyor 15 is provided which is synchronized with the conveyor 14 and advances the same distance $S_2$ for each cycle of operation of the conveyor 14. In a sense, the sausages are lightly pinched between the conveyors 14 and 15, and are thus perfectly controlled.

At the point A, farther to the left, the conveyor 14 withdraws from under the sausages which are about to be picked up by a further conveyor 16 which happens to be a belt. The belt 16 picks up the sausages at B and moves at a lower velocity, namely $v - \Delta v$, but is timed to start and stop simultaneously with the conveyor 14. It advances a distance $S_3$ per cycle of operation which is chosen to be equal to the sausage diameter in the event the sausages are to be packed snugly, or a little less than the diameter, in the event the sausages are to be squeezed together tightly, so as to develop flat areas of contact.

The overhead conveyor is arranged to overlap the area between A and B and does not withdraw from engagement until the point C is reached.

Between the points B and C each sausage is advanced a little faster at the top due to the higher velocity $v$ of the conveyor 15 than at the bottom where the rate of advance is only $v-\Delta v$. As a result the sausage rolls slightly in a counterclockwise direction. This movement aids in the tight grouping of the sausages downstream with respect to point A.

The conveyor 16 may be called an outfeed conveyor, as it discharges the articles in the tightly packed arrangement.

The tight arrangement of the sausages downstream of points A and B may be considered a condition of jamming to which the sausages tend to respond by moving upwardly. Such upward movement is preventable by a hold down means which, in the illustrated case, is a hold down conveyor 17. It also moves at the velocity $v-\Delta v$.

The sausages deform sufficiently under the hold down conveyor so that their tendency to rise is overcome by the time they emerge from under the conveyor 17. Now the tightly arranged articles may be disposed of in any desired manner.

For example, they may move against and deflect a pivoted signal arm 18 which is under the tension of a spring 19 and operates a microswitch 20 which may then operate a vacuum device to remove a group of six or eight sausages in an upward direction. The vacuum device is not shown, as it does not form a portion of this invention and may be replaced by any other form of removal device.

After removal of a group of sausages the signal arm swings to the right under the action of the spring, whereafter the arm is again deflected to the left by the newly arriving sausages.

Signal arm 18, by swinging to the right after the removal of a group of sausages, also acts as a stop preventing the lead sausage, emerging from under conveyor 17, from rolling ahead as a result of the intermittent motion of conveyors 16 and 17.

It is evident that the operation of the removal device is related to the supply of sausages to the conveying mechanism from the right. If the supply is steady, the removal device operates with a uniform frequency. If the supply is irregular, the timing of the removal operation also becomes irregular, but in each instance removal does not take place until a full load of six or eight sausages is present.

With an understanding of the basic operation of the mechanism, it will now be easy to follow details of construction and control.

The various elements of the mechanism are mounted on, or at least supported by, a base generally designated as 21.

Figure 3:
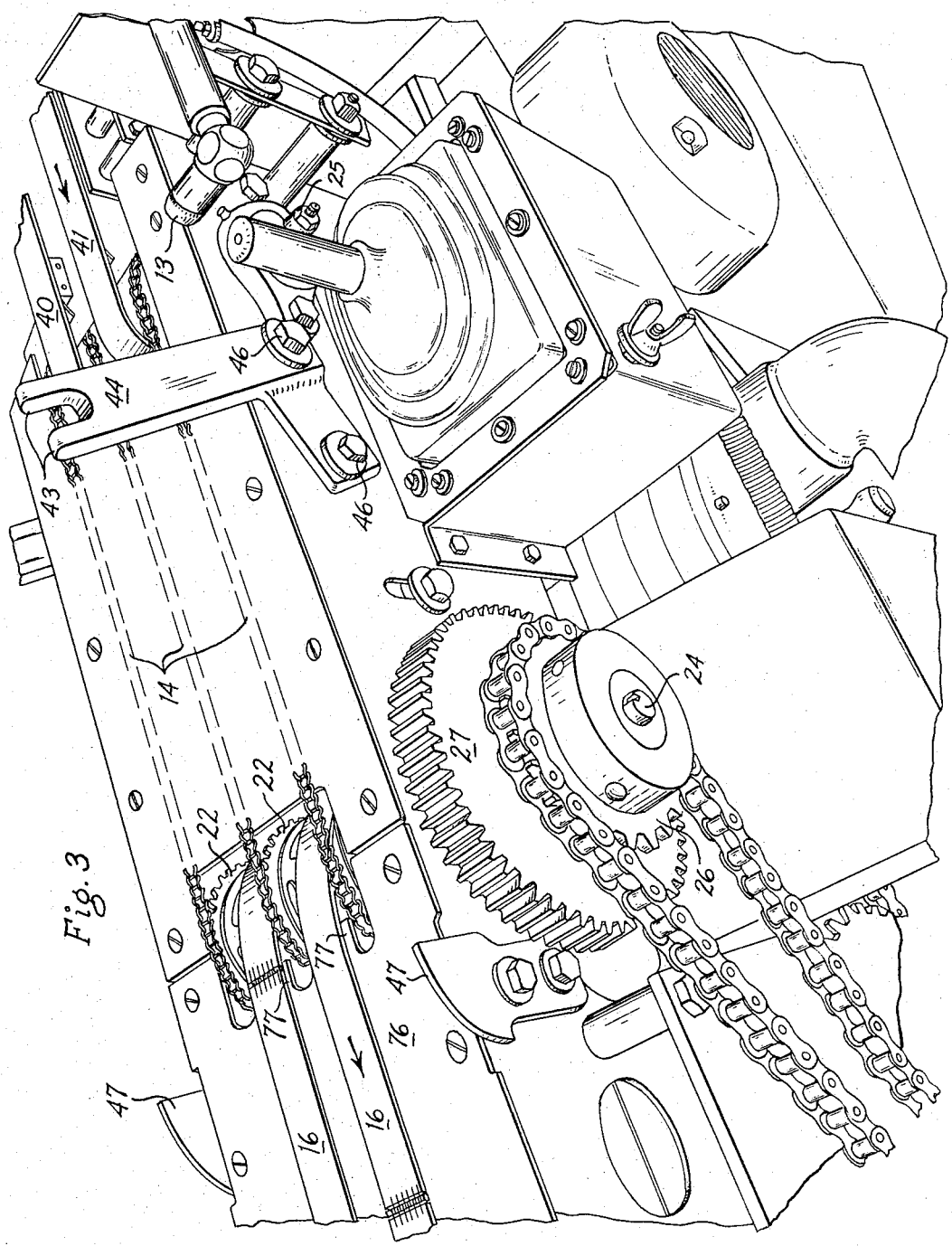
FIG. 3 is a perspective view of the central portion of the mechanism after removal of a unit comprising two overhead conveyors.

The chain conveyor 14 is trained around sprocket gears 22 and 23 on shafts 24 and 25, shaft 24 being a driven shaft to which a driven sprocket gear 26 and a spur gear 27 are keyed (see also FIG. 3). A drive chain 28 extends from a drive unit generally designated 29 over idler gears 30 and 31. The drive unit comprises a drive shaft 32 on which a driving sprocket 33 is fixed.

The drive unit comprises a continuously driven shaft 34 and a driving plate 35 (FIG. 5) to which a driven plate 36 on the shaft 32 may be coupled upon energization of an electromagnet 37. Alternatively, the driven plate 36 may be uncoupled from the drive plate 35 and be attracted to a fixed brake plate 38 upon energization of a further electromagnet 37'.

Returning to FIG. 1, the drive unit 29 comprises a clutch and a brake and represents a typical start-stop drive, also sometimes referred to as an intermittent drive.

It follows that the shaft 24, the gear assembly 22, 26, 27 and the chain or link conveyor 14 may be intermittently started and stopped. As will later be seen from a consideration of the control diagram FIG. 5, the intermittent drive is initiated by a signal of the detector device which comprises the photocell 13.

In the illustrated mechanism the photocell is so placed as to signal the arrival of an object 11 at the pickup end of the conveyor 14 which thereupon moves in the direction 12 by a distance $S_2$.

The assembly of overhead and hold down conveyors 14 and 17 is preferably constructed as an integral unit partially enclosed in a housing 39 and permits complete removal of the conveyors and access to the track of the chain or link conveyor 14.

In FIG. 3 the overhead unit is removed to expose the chain link conveyor 14. FIG. 3 further shows a delivery means in the form of two conveyor belts 40 and 41 which supply articles to the conveyor and advance them at least far enough to cause the detector unit composed of a light source and photocell 13 to be actuated.

Returning to the overhead unit partially housed in the housing 39, the unit rests with studs 42 in the forked end 43 of a bracket 44 secured to the base 21 at 45 and 46. Farther to the left a pair of blade-like projections 47 is mounted on the base 21 on which a downwardly extending bracket 48 on the housing 39 seats.

Figure 2:
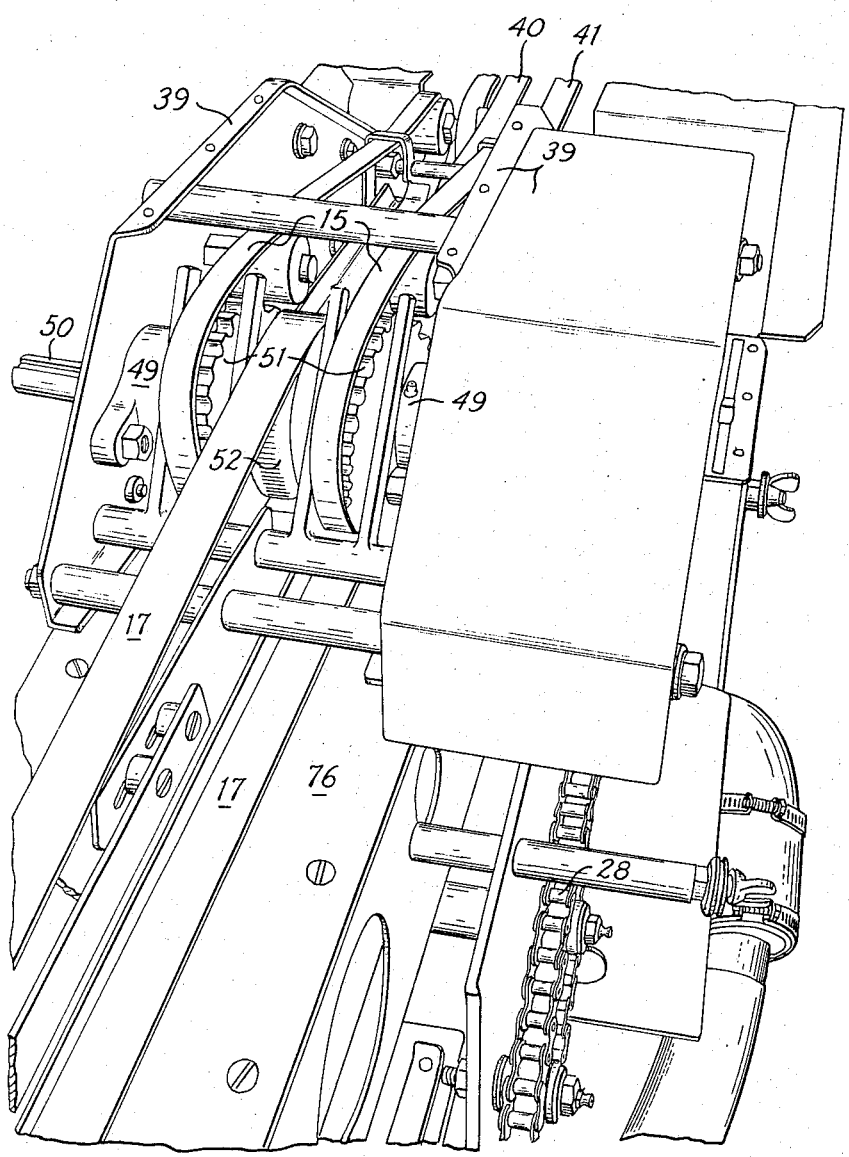
FIG. 2 is a perspective view of the mechanism from its delivery end.

The housing comprises bearings 49 for a shaft 50. The bearings are best seen in FIG. 2 which also shows the disposition of two large belt pulleys 51 for the overhead belts 15 and a smaller diameter pulley 52 for the hold down belt 17. All pulleys are keyed to the shaft 50. On the right end of the shaft 50, and hidden in the housing 39, is a spur gear 53 which meshes with spur gear 27 and drives the overhead unit when the unit is in place as it is shown in FIGS. 1 and 2.

The difference in the diameters of the pulleys 51 and 52 accounts for the higher belt velocity $v$ of belt 15 and the lower velocity $v-\Delta v$ of the belt 17.

Turning back to FIG. 1, it is seen that at the right the overhead conveyor 15 is trained around a pulley 54 on a shaft 56. The bracket 55 is fixed on a tilt shaft 57 to the near end of which a substantially horizontal finger or arm 58 is clamped.

Figure 4:
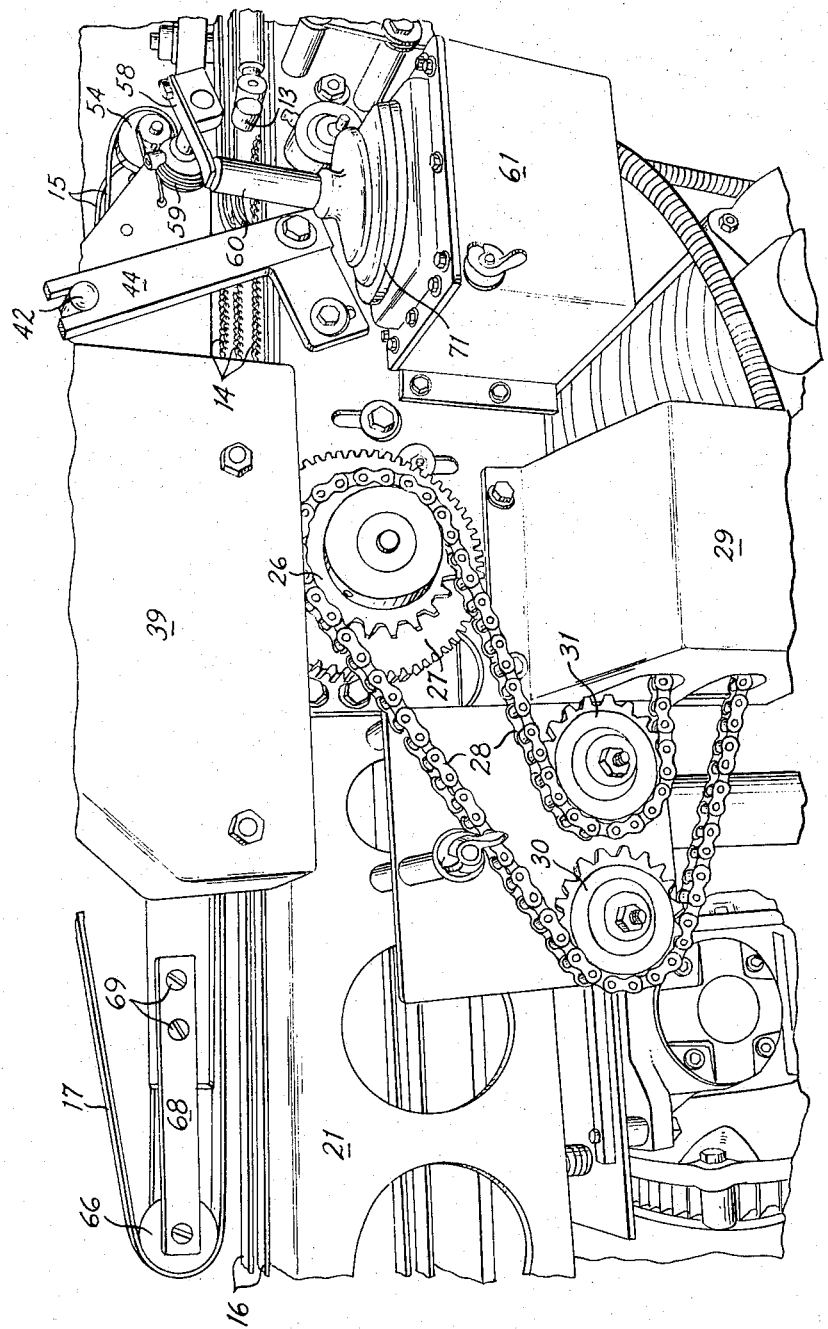
FIG. 4 is a perspective side view of the mechanism.

The shaft is under the action of a safety pin type spring 59 (seen only in FIG. 4) which biases the shaft in a counterclockwise direction and tends to keep the pulley 54 raised and the finger depressed.

In the raised position of the pulley the belt 15 is out of contact with an article at or near the detector unit 13 and does not interfere with the delivery of an article to the detector station.

The end of the finger 58 rests on a stem 60 of a solenoid 61 which, when energized, pushes the stem 60 up to depress the end of the conveyor 15 into driving engagement with the article which caused the detector 13 to respond. The stem 60 is sealed with respect to the solenoid housing by a rubber bellows or boot 71.

Inside the housing 39 the overhead belt 15 extends over an idler pulley 65 within its top run and under a guide shoe 62 whose leading and trailing ends 63, 64 are turned up slightly. These ends control the points at which the belt 15 engages with, and disengages from, the articles 11 below it.

The left end of the hold down conveyor 17 extends over a pulley 66 whose shaft 67 is mounted on an outrigger arm 68 whose length is adjustable at 69 to permit proper tensioning of the belt 17. The outrigger arm is secured to the housing 39 at 70.

The signal arm is pivotally mounted on the base 21 at 72. It carries a freely turning cylindrical head 73 whose center axis is slightly higher than the axes of the articles 11 bearing against it. This arrangement tends to urge the articles 11 downwardly to maintain engagement with the belt which is trained around a pulley 74.

The conveyor 16, it will be recalled, advances more slowly (v−Δv) and a shorter distance (S₃) than the chain link conveyor 14.

Assuming the pitch diameter of the sprocket gear 22 which drives the chain conveyor to be D, the diameter of the pulley 75 which drives the conveyor 16 is smaller, namely D—D so as to cause the conveyor 16 to travel a shorter distance S₃ during the same period during which the conveyor 14 advances by the distance S₂. The difference in diameter is well visible in FIG. 3.

The belts 16 extend over a guide surface 76, the leading end 77 of which is curved downwardly and determines the point B at which the conveyor 16 moves into engagement with the articles 11.

Figure 5:
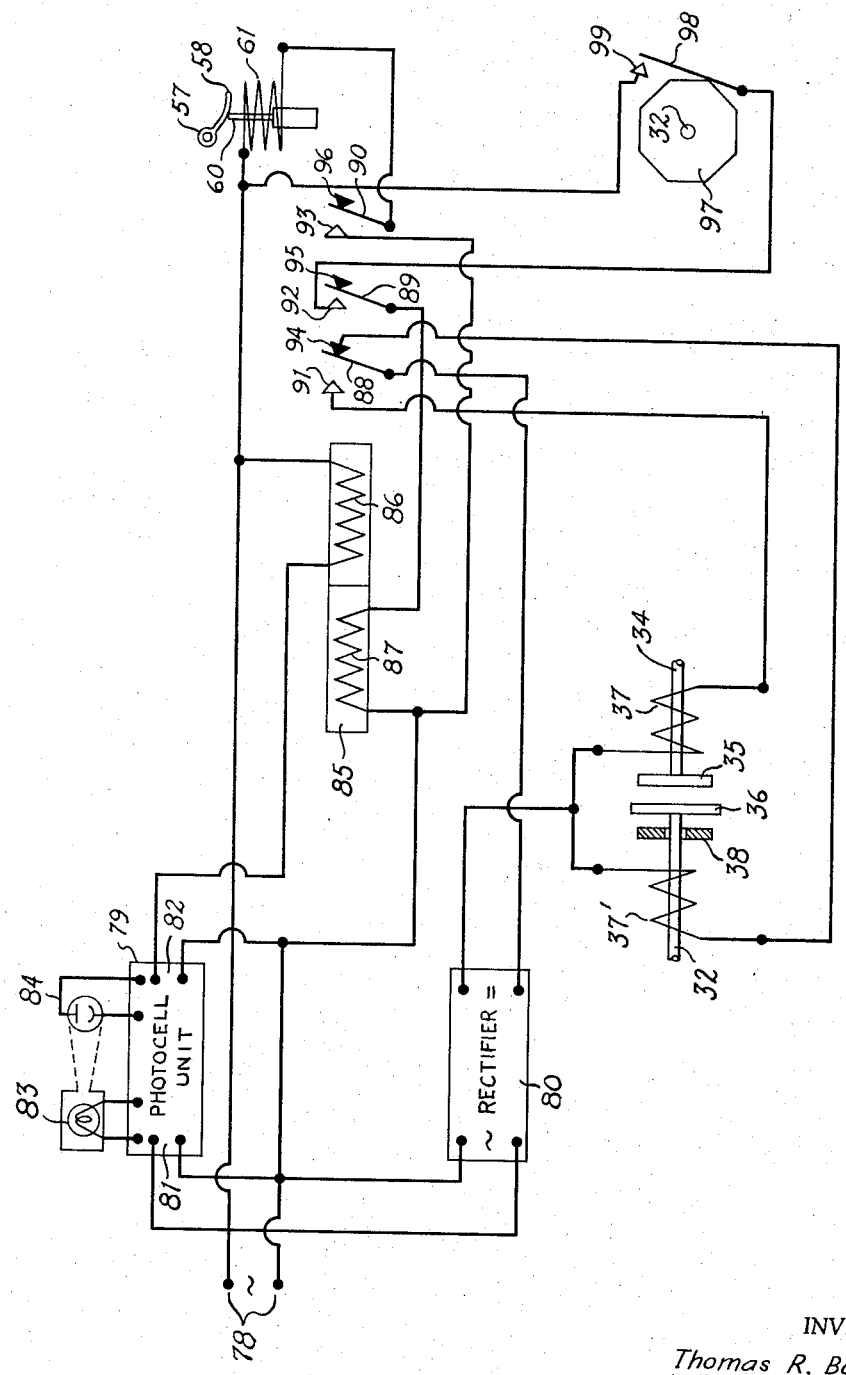
FIG. 5 is a diagram of electrical control and operating devices of the conveying mechanism.

Turning finally to the controls, and referring to FIG. 5, a source of alternating current is shown at 78 and supplies a photocell unit 79 as well as a rectifier 80.

The photocell unit has input terminals 81, output or signal terminals 82 and terminals for a light beam source 83 and the photocell proper 84.

A relay is generally indicated as 85. It has two windings 86 and 87 and three sets of contacts which are movable contacts 88, 89, 90, make contacts 91, 92, 93 and break contacts 94, 95, 96, the last two being idle.

A cam 97 on the output shaft operates contact 98, 99 which are open when opposite a high cam portion, and closed when opposite a low cam portion.

Upon receipt of a signal put out by the photocell, the relay winding 86 is energized as follows: From the upper terminal 78 through winding 86 to the upper output terminal 82, through the closed signal circuit of unit 79, lower output terminal 82, back to the source 78.

The relay 85 closes its make contacts and opens its break contacts. Starting at the left, contacts 88, 94 are broken, thereby deenergizing the brake winding 37'. Contacts 88, 91 are closed, thereby energizing the clutch winding 37. The shaft 32 begins to turn and so does the cam, thereby closing contacts 98, 99.

This permits the relay to hold itself energized over its second winding 87, the circuit being as follows: From the lower terminal 78 through the relay winding 87, make contacts 89, 92, closed cam contacts 98, 99 back to the upper source terminal 78. The relay therefore will remain energized, regardless of the brevity of the photocell signal, and will remain energized until the cam contacts 98, 99 reopen, which happens after the conveyor has moved the required distance.

The relay also energizes the solenoid 61 as follows: From the lower source terminal 78 through make contacts 93, 90, solenoid coil 61 back to the source (upper terminal).

It this appears that clutch 36, 35 remains engaged and the relay 85 remains energized until the cam 97 cuts the relay off. In the meantime, the photocell signal has expired as the article 11 moved out of the path of the light beam. The relay then drops its armature, the make contacts are broken and the break contacts are reestablished, as a result of which the clutch 36, 35 is disengaged and the brake 36, 38 is applied, as the brake winding becomes energized over contacts 94, 88.

Upon arrival of the next article 11 at the photocell the described operation cycle is repeated.

What is claimed is:

1. A conveying device for grouping articles, the device comprising, in combination, a main straight-line conveyor; supply means for suplying to said main conveyor articles to be conveyed; detector means responsive to the delivery by said supply means of an article to said main conveyor; intermittent drive means actuable by said detector means for advancing said main conveyor by a predetermined distance for each article; an overhead conveyor above said main conveyor for engaging from above articles on said main conveyor, said overhead conveyor being timed to move simultaneously with said main conveyor, means to move at least the leading portion of said overhead conveyor towards, and away from, said main conveyor in response to moving and stopping, respectively, of the main conveyor to grasp articles between the two conveyors; an outfeed conveyor in line with said main conveyor for receiving articles from the latter, said outfeed conveyor being timed to operate simultaneously with, but at a slower linear rate than, said main conveyor; and hold down means above said outfeed conveyor for preventing articles from being forced upward out of engagement with said outfeed conveyor.

2. A conveying device according to claim 1 particularly for compressible articles of substantially circular cross section in which the advance, per article, of the main conveyor is greater than the average article diameter and in which the advance per article of the outfeed conveyor is less than the average article diameter, as a result of which the articles are pressed tightly together.

3. A conveying device according to claim 1 in which the detector means comprises a photocell located at the article receiving end of the main conveyor and in which the movable overhead conveyor portion extends sufficiently far upstream to grasp an article in the position in which the article actuates the detector means.

4. A conveying device according to claim 1 in which the overhead conveyor extends farther downstream than the main conveyor and overlies the receiving end of the outfeed conveyor.

5. A conveying device according to claim 1 in which the drive means comprises a clutch/brake unit in which the engagement clutch is controlled by said detector means and in which the release of the clutch and the engagement of the brake is controlled by a cam means operable by said main conveyor.

6. A conveying device according to claim 1 in which the drive means is started by said detector means and is stopped in response to the travel of the main conveyor by a predetermined distance.

7. A conveying device according to claim 1 in which the overhead conveyor comprises a movable upstream portion movable into and out of engagement with articles on the main conveyor in response to moving and stopping, respectively, of the main conveyor and a downstream portion above and so spaced from the upstream portion of the outfeed conveyor as to maintain engagement with articles on the outfeed conveyor underneath the said downstream portion.

8. A conveying device according to claim 1 in which the hold down means is a separate hold down conveyor above said outfeed conveyor, the hold down conveyor being driven to move at substantially the same linear rate as the outfeed conveyor.

References Cited

UNITED STATES PATENTS

| | | |
|---|---|---|
| 1,482,197 | 1/1924 | Kimball. |
| 2,133,727 | 10/1938 | Staude _____ 198—165 |
| 2,319,213 | 5/1943 | Davies _____ 198—165 X |

ANDRES H. NIELSEN, *Primary Examiner.*

EVON C. BLUNK, *Examiner.*

R. J. HICKEY, *Assistant Examiner.*